United States Patent
Zhang et al.

(10) Patent No.: US 8,706,989 B2
(45) Date of Patent: Apr. 22, 2014

(54) DATA STORAGE DEVICE WITH POWER-OFF RECOVERY SYSTEM AND METHOD THEREOF

(75) Inventors: Bo Zhang, Taipei (TW); Honggang Chai, Taipei (TW); Liang Chen, Taipei (TW)

(73) Assignee: VIA Technologies, Inc. (TW)

( * ) Notice: Subject to any disclaimer, the term of this patent is extended or adjusted under 35 U.S.C. 154(b) by 932 days.

(21) Appl. No.: 12/849,369

(22) Filed: Aug. 3, 2010

(65) Prior Publication Data

US 2011/0131365 A1  Jun. 2, 2011

(30) Foreign Application Priority Data

Nov. 30, 2009  (CN) .......................... 2009 1 0225557

(51) Int. Cl.
*G06F 12/00* (2006.01)
*G06F 11/14* (2006.01)
*G06F 12/02* (2006.01)

(52) U.S. Cl.
CPC ........ *G06F 11/1441* (2013.01); *G06F 12/0246* (2013.01)
USPC .............................. 711/162; 711/167; 711/203

(58) Field of Classification Search
CPC ........................ G06F 11/1441; G06F 12/0246
USPC ................. 711/103, 162, 203, 167, E12.001, 711/E12.008, E12.058
See application file for complete search history.

(56) References Cited

U.S. PATENT DOCUMENTS

| | | | | |
|---|---|---|---|---|
| 5,369,757 A | * | 11/1994 | Spiro et al. ...................... | 714/19 |
| 2007/0180000 A1 | | 8/2007 | Mine et al. | |
| 2012/0030415 A1 | * | 2/2012 | Selfin et al. ................... | 711/103 |

* cited by examiner

*Primary Examiner* — Pierre-Michel Bataille
(74) *Attorney, Agent, or Firm* — McClure, Qualey & Rodack, LLP (57) ABSTRACT

A data storage system and method are disclosed. The data storage system includes a first and a second memory and a memory control unit. The first memory is non-volatile, and the second memory is designed to store dynamic information of the first memory. The memory control unit includes a snapshot module, a recording module and a power-off recovery module, and is operative to handle the data loss of the second memory when an unexpected power-off occurs. When the power of the system is recovered, an initial address stored in the first memory by the snapshot module and link information and updating information recorded in the first memory by the recording module are obtained by the power-off recovery module to recovery the second memory.

20 Claims, 5 Drawing Sheets

DATA STORAGE DEVICE WITH POWER-OFF RECOVERY SYSTEM AND METHOD THEREOF

CROSS REFERENCE TO RELATED APPLICATIONS

This Application claims priority of Chinese Patent Application No. 200910225557.4, filed on Nov. 30, 2009, the entirety of which is incorporated by reference herein.

BACKGROUND OF THE INVENTION

1. Field of the Invention

The present invention relates to data storage systems and data storage methods, and in particular, relates to power-off recovery of dynamic information of a memory.

2. Description of the Related Art

Conventional data storage devices include hard discs and optical discs. Today, new data storage techniques have been developed. For example, solid state discs (SSD), a substitute for hard discs, use NAND flashes for data storage. The NAND flash is a non-volatile memory, widely used in portable electronic devices. For example, in an mp3 audio player, the NAND flash is used as a popular storage medium.

Figure 1:
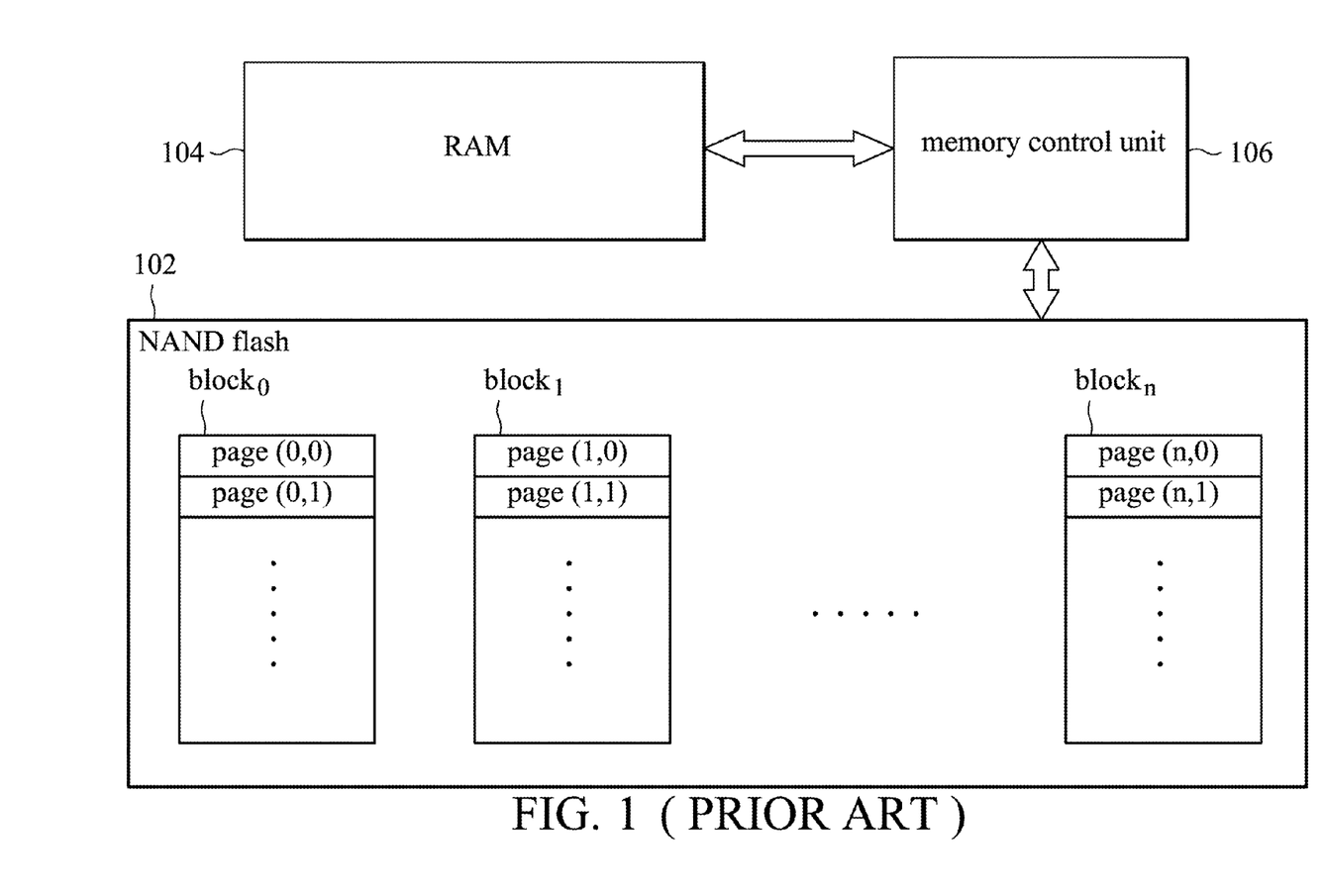
FIG. 1. depicts a block diagram of a data storage system.

FIG. 1 shows a block diagram depicting a data storage system, in which a NAND flash 102 is used as a storage medium. As shown, the NAND flash 102 has a plurality of blocks (numbered $block_0$, $block_1$ ... $block_n$) and each block can be divided into a plurality of pages. For example, the block $block_0$ includes a plurality of pages page(0, 0), page(0, 1) ..., the block $block_1$ includes a plurality of pages page(1, 0), page(1, 1) ..., and the $block_n$ includes a plurality of pages page(n, 0), page(n, 1) .... To write or read the NAND flash 102, a "Logical Address", used in the host (not shown), has to be mapped to a "Physical Address" representing the physical space of the NAND flash 102. Thus, a logical-to-physical address mapping table is required. The physical space may be divided into blocks, pages or even smaller storage spaces. Because the physical space of the NAND flash 102 is dynamically allocated to the logical addresses, the logical-to-physical address mapping table is constantly changing. The random access memory (RAM) 104 is designed to store the logical-to-physical address mapping table. In addition to controlling the operations of the NAND flash 102, the memory control unit 106 manages the logical-to-physical address mapping table stored in the RAM 104.

Because the RAM 104 is a volatile memory, it requires power to maintain the stored logical-to-physical address mapping table. It is an important issue to recover the stored logical-to-physical address mapping table when the RAM 104 recovers from an unexpected power-off.

BRIEF SUMMARY OF THE INVENTION

The invention discloses data storage systems and data storage methods.

An exemplary embodiment of the data storage system comprises a first memory, a second memory and a memory control unit, wherein the memory control unit comprises a snapshot module, a recording module and a power-off recovery module.

The first memory is a non-volatile memory and includes a plurality of blocks. The second memory stores dynamic information of the first memory. The memory control unit is coupled to the first and second memories. The functions of the snapshot, the recording and the power-off recovery modules are described as follows. The snapshot module works during a snapshot interval, to store an initial address into the first memory, wherein the initial address indicates a starting block in the first memory. The starting block is the block allocated for a subsequent normal operation. The recording module works during a normal operation interval, to instantly record updating information to free space of allocated blocks, and to instantly record link information linking allocated blocks altered during the normal operation interval. The power-off recovery module works during a power-off recovery interval after an unexpected power-off, to utilize the initial address that the snapshot module stored in the first memory and the link information and the updating information that the recording module recorded in the allocated blocks to recover the second memory to maintain the dynamic information of the first memory without being affected by the unexpected power-off.

In another exemplary embodiment, a data storage method is disclosed. A first memory, non-volatile and including a plurality of blocks, is provided for the user to store data. A second memory is provided to store dynamic information of the first memory. A snapshot interval is provided to store an initial address into the first memory, wherein the initial address indicates a starting block in the first memory. The starting block is the block allocated for a subsequent normal operation. During a normal operation interval, instant recording of updating information to allocated blocks altered during the normal operation interval of the first memory is performed while link information linking the allocated blocks is recorded. When an unexpected power-off occurs, the first memory is accessed for the initial address, the updating information and the link information to recover the dynamic information stored in the second memory.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description shows several exemplary embodiments of the invention. This description is made for the purpose of illustrating the general principles of the invention and should not be taken in a limiting sense. The scope of the invention is best determined by reference to the appended claims.

Figure 2:
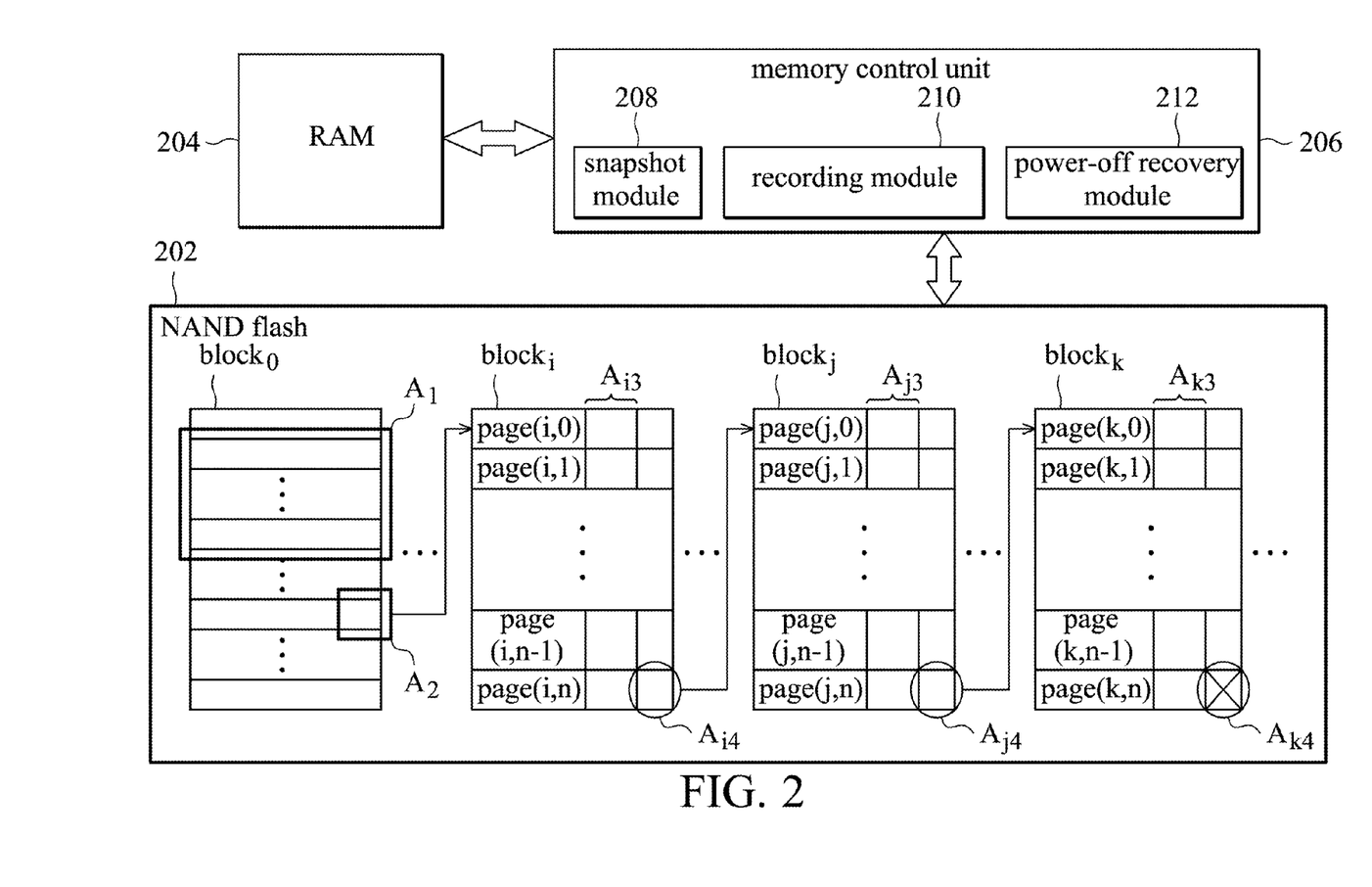
FIG. 2 depicts an exemplary embodiment of the disclosed data storage system.

FIG. 2 depicts an exemplary embodiment of a data storage system. The data storage system comprises a NAND flash 202 (working as a first memory), a RAM 204 (working as a second memory) and a memory control unit 206. The memory control unit 206 comprises a snapshot module 208, a recording module 210 and a power-off recovery module 212.

The NAND flash 202 is a non-volatile memory. As shown, there are blocks (labeled from $block_0$ to $block_i$, to $block_j$, to $block_k$ and so on) in the NAND flash 202. Each block is further divided into a plurality of pages. For example, a block $block_i$ includes pages page(i, 0), page(i, 1) . . . page(i, n), a block $block_j$ includes pages page(j, 0), page(j, 1) . . . page(j, n), and a block $block_k$ includes pages page(k, 0), page(k, 1) . . . page(k, n). The RAM 204 stores dynamic information of the NAND flash 202. The dynamic information may be a logical-to-physical address mapping table, identification of deficient blocks, or other dynamically changed information of the NAND flash 202. The memory control unit 206 is coupled to the NAND flash 202 and the RAM 204. The memory control unit 206 includes snapshot module 208, recording module 210 and power-off recovery module 212 of the memory control unit 206, which are designed to deal with the data loss of the RAM 204 when an unexpected power-off occurs.

The snapshot module 208 works during a snapshot interval, to capture an initial address indicating a starting block (e.g. $block_i$, allocated for a subsequent normal operation) in the NAND flash 202. As shown, the snapshot module 208 records the initial address in physical space $A_2$ of the NAND flash 202. In some embodiments, the starting block may be the most recent allocated and altered block of the NAND flash 202 before the snapshot interval. The snapshot module 208 may further access the RAM 204 to update logical-to-physical address mapping table of the NAND flash 202 stored in a physical space $A_1$ of the NAND flash 202 with the modification during the normal operation interval between the last snapshot interval and this snapshot interval. As shown, the physical space $A_1$ and $A_2$ may be within the same block (e.g. $block_0$). In some embodiments, the physical space $A_1$ and $A_2$ are continuous addresses of the same block. However, in other embodiments, the space $A_1$ and $A_2$ may be contained in different blocks. Note that the allocation of the physical space $A_1$ and $A_2$ is not intended to limit the present invention. In some embodiments, the memory control unit 206 may dynamically allocate dedicated blocks of the NAND flash 202 to backup the dynamically changed information, such as the logical-to-physical address mapping, of the NAND flash 202.

Figure 3:
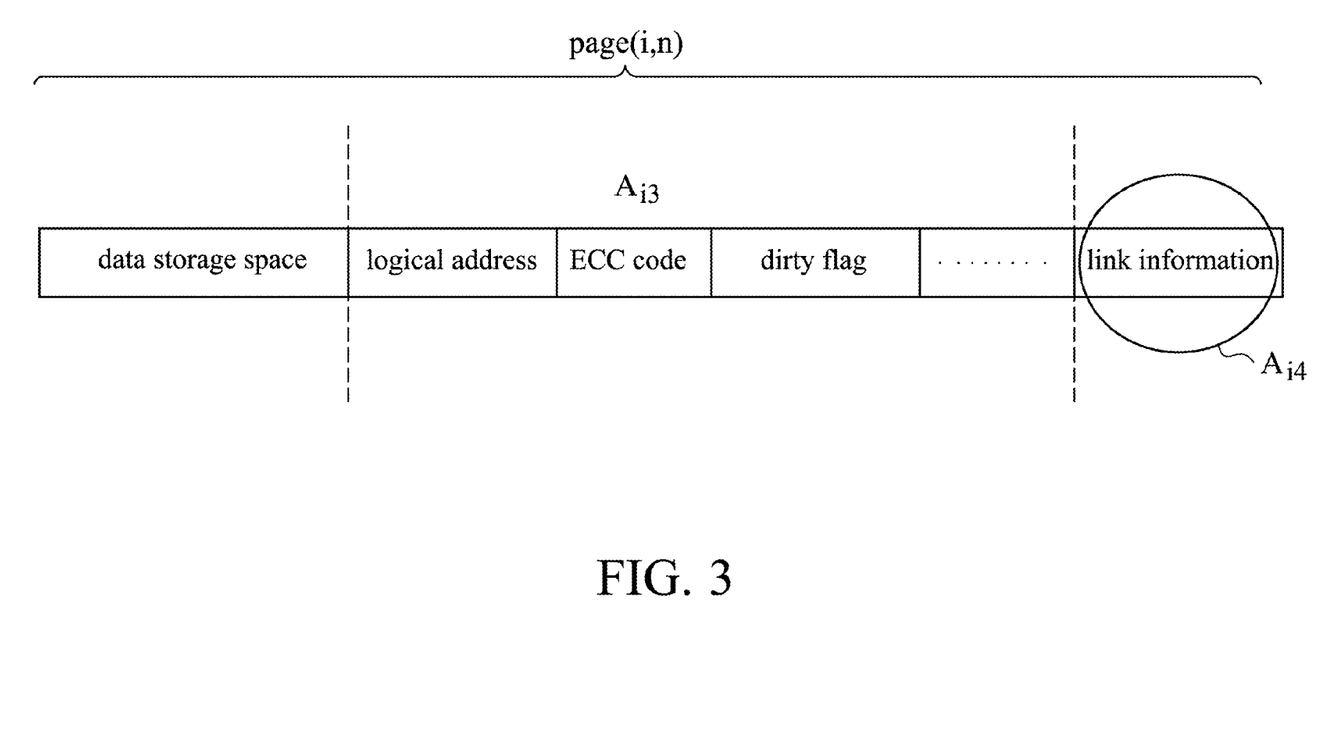
FIG. 3 depicts a page with backup of corresponding updating information and link information linking to a subsequently allocated block.

The recording module 210 works during a normal operation interval. In this embodiment, the allocated blocks, in which the data is altered during the normal operation interval, include the blocks $block_i$, $block_j$ and $block_k$. The recording module 210 may utilize free space, e.g. Ai3, Aj3 and Ak3, of the allocated blocks $block_i$, $block_j$ and $block_k$ to record updating information of the NAND flash 202, and may further utilize remaining free space, e.g. Ai4, Aj4 and Ak4, of the allocated blocks $block_i$, $block_j$ and $block_k$ to record link information between the allocated blocks $block_i$, $block_j$ and $block_k$. In an exemplary embodiment, the physical space containing space Ai3, Aj3 and Ak3 spreads over the free space of every page of the allocated blocks $block_i$, $block_j$ and $block_k$, wherein a logic address corresponding to the physical page, an ECC code and a dirty flag indicating whether the data in the page is invalid may be recorded in each page. After the user data and the updating information have been stored in the NAND flash 202, the remained free space of the allocated $block_i$, $block_j$ and $block_k$ may be utilized as the physical space Ai4, Aj4 and Ak4. Taking the last page page(i, n) of $block_i$ for example, FIG. 3 shows the page page(i, n), which contains the updating information and the link information. As shown, the page page(i, n) includes a data storage space for the user to store data, a physical space Ai3 storing the logical address that the page page(i, n) corresponds to, the ECC code and the dirty flag of the data stored in the data storage space, and a physical space Ai4 storing the link information. A subsequently allocated block (i.e. $block_j$) is obtained according to the link information recorded in the physical space Ai4.

Referring back to FIG. 2, the power-off recovery module 212 works during a power-off recovery interval. According to the recorded information in the NAND flash 202 (including the information recorded in the physical space $A_1$, $A_2$, Ai3, Aj3, Ak3, Ai4, Aj4 and Ak4) recorded by the snapshot module 208 and the recording module 210, the power-off recovery module 212 restores the RAM 204 back to the state containing the same dynamic information of the NAND flash 202 as before the unexpected power-off.

Figure 4:
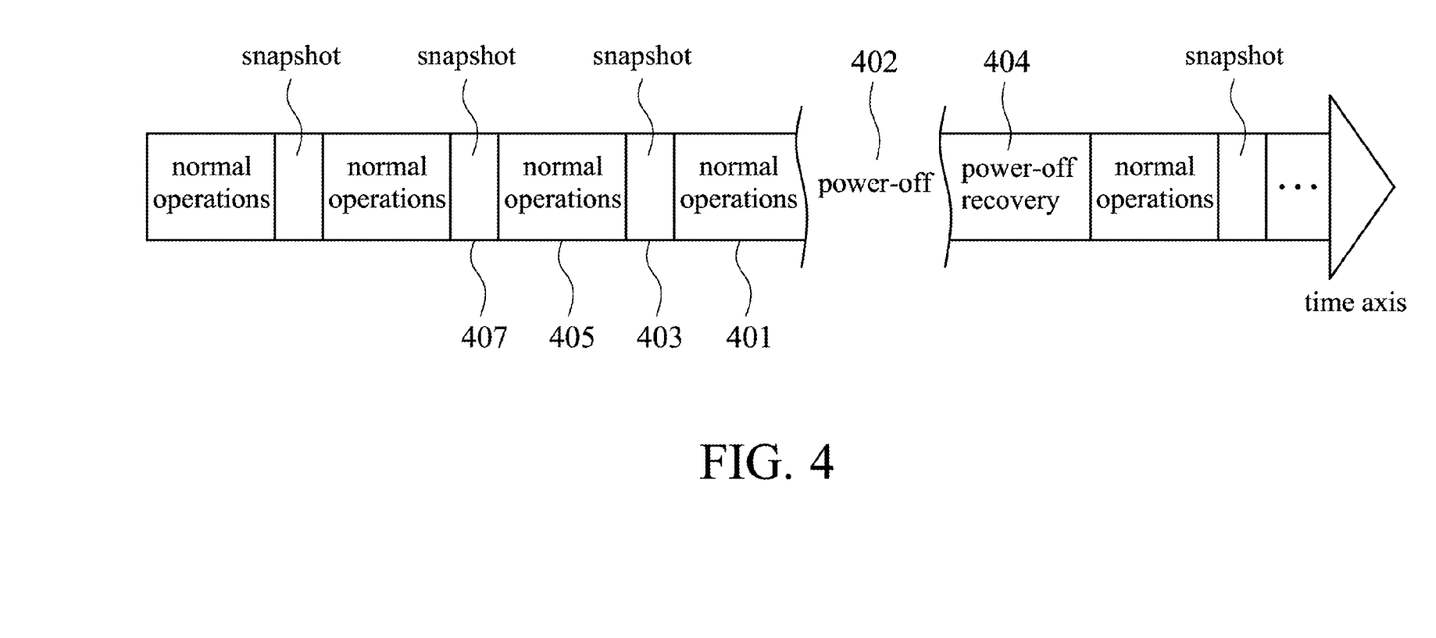
FIG. 4 depicts the timing of the snapshot, normal operation and power-off recovery intervals.

FIG. 4 shows the timing of the snapshot, normal operation and power-off recovery intervals. Along the time axis, snapshots and normal operation intervals happen alternatively. The snapshot may happen every predetermined time period, or every time a predetermined amount of data is stored to the NAND flash 202. When an unexpected power-off (e.g. 402) occurs, the power-off recovery 404 is required to recover the dynamic information of the NAND flash 202 contained in the RAM 204.

In the following paragraphs, a logical-to-physical address mapping table is taken as an example of the dynamic information to discuss the power-off recovery of the RAM 204. Referring back to FIG. 2 and meanwhile referring to FIG. 4, during the most recent normal operation interval 401 before the unexpected power-off 402, the allocated blocks including blocks $block_i$, $block_j$ and $block_k$ are allocated to use one after another and the logical-to-physical address mapping table corresponding to the allocated blocks is changed without snapshot. To prevent this part of the logical-to-physical address mapping from being lost when the unexpected power-off occurs, techniques are presented as follows.

During the most recent snapshot interval 403 before the unexpected power-off, the snapshot module 208 captures the physical address of the allocated block (or the presently used block) $block_i$ as the initial address, and stores it in the physical space $A_2$ of the NAND flash 202. In addition, the snapshot module 208 update the logical-to-physical address mapping table stored in a physical space $A_1$ of the NAND flash 202 with the modification during the normal operation interval 405 between the most recent snapshot interval 403 and the snapshot interval 407.

During the most recent normal operation interval 401 before the unexpected power-off, the block $block_i$ is the starting block, and the blocks $block_j$ and $block_k$ are subsequently allocated. The updating information, such as the logical address, of each page of the allocated blocks $block_i$, $block_j$ and $block_k$ may be recorded. The recording module 210 may record the logical address of every page of the allocated blocks $block_i$, $block_j$ and $block_k$ to the physical space Ai3, Aj3 and Ak3. The updating information may be utilized later if power-off recovery is required. In addition, the recording module 210 may further record link information, which is the physical addresses of the subsequently allocated blocks $block_j$ and $block_k$ respectively to the physical space Ai4, Aj4 provided by the blocks $block_i$ and $block_j$. The recording of link information helps to obtain the allocated blocks, e.g. $block_i$, $block_j$ and $block_k$, altered in the most recent normal operation interval 401 before an unexpected power-off. For example, the physical space Ai4 of the starting block $block_i$ stores the physical address of the subsequently allocated block $block_j$, and the physical space Aj4 of the block $block_j$ stores the physical address of the subsequently block $block_k$. Note that no link information is contained in the free space Ak4 of the most recent allocated block $block_k$.

If an unexpected power-off occurs, power-off recovery is required when the power is restored so that the data dynamically stored in the RAM 204 may be recovered. By using the power-off recovery module 212, the starting block $block_i$ is obtained according to the initial address stored in the physical space $A_2$, the subsequently allocated block $block_j$ is obtained according to the link information stored in the physical space Ai4 of the starting block $block_i$, another block $block_k$ is obtained according to the link information stored in the physical space Aj4 of the block $block_j$, and the block $block_k$ is obtained as the most recent allocated blocks since no link information is stored in the physical space Ak4 of the block $block_k$. From the physical space Ai3, Aj3 and Ak3 of the obtained allocated blocks $block_i$, $block_j$ and $block_k$, the logical addresses of the corresponding pages are obtained. These logical addresses combined with the logical-to-physical address mapping table backup in the physical space $A_1$, a correct logical-to-physical address mapping table is recovered in the RAM 204 so that it contains the dynamic information of the NAND flash 202 as before power-off.

In another embodiment, the most recent allocated blocks may be obtained by other techniques. For example, the NAND flash 202 may record data block by block. No blank page is reserved in the current block if the next block is allocated. Thus, the most recent allocated block can be determined when the obtained block contains at least one blank page. The obtained blank page indicates that the corresponding block is being used when the unexpected power-off occurs, and the block is the most recent block allocated during the most recent normal operation interval 401 before power-off.

The disclosed techniques can efficiently recover a RAM 204 from an unexpected power-off, and can optimize block allocation during the normal operation interval. In the power-off recovery interval, a search of the allocated blocks altered during the most recent normal operation interval is performed rather than a search of the entire NAND flash 202. By searching the most recent allocated blocks, altered logical-to-physical address mapping without snapshot may be obtained to correct previous backups. Compared with the conventional techniques which search the entire NAND flash 202 to recover the logical-to-physical address mapping table, the disclosed technique allows faster power-off recovery. In addition, the disclosed technique simplifies block allocation during the normal operation interval. In the specification, the blocks can be allocated one by one. Compared with conventional techniques in which a series of blocks are reserved in advance, the disclosed block allocation is more flexible.

Figure 5:
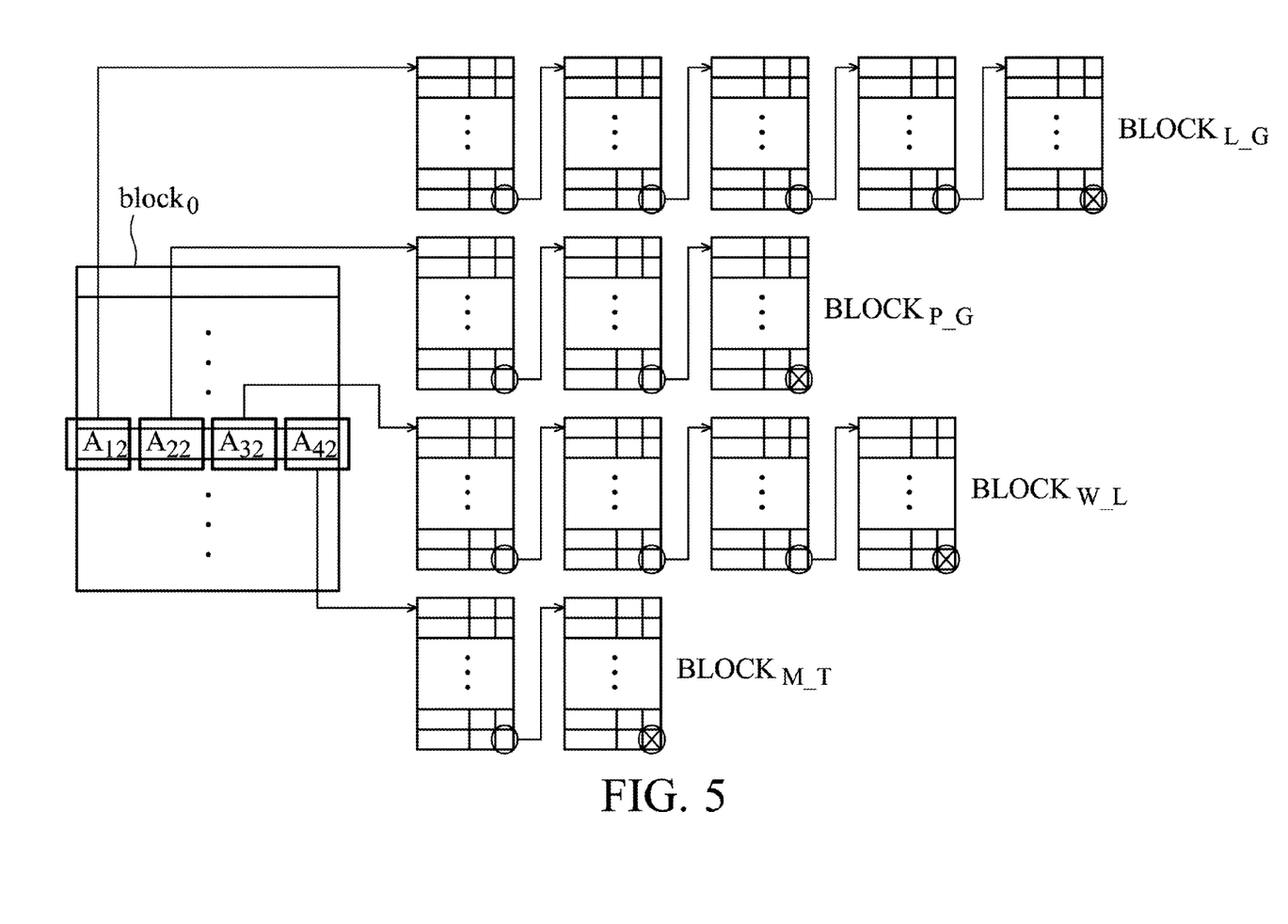
FIG. 5 depicts the links between allocated blocks when the first memory stores data plane by plane.

In some embodiments, multiple blocks are allocated in parallel. For example, in a page mapping algorithm, the data storage is plane by plane and, for a write operation, each plane requires four blocks in parallel. The four blocks are designed for logical garbage collection, physical garbage collection, wear leveling, and mapping table backup, respectively. In FIG. 5, the blocks for logical garbage collection are labeled as $BLOCK_{L\_G}$, the blocks for physical garbage collection are labeled as $BLOCK_{P\_G}$, the blocks for wear leveling are labeled as $BLOCK_{W\_L}$, and the blocks for mapping table backup are labeled as $BLOCK_{M\_T}$. In the most recent snapshot interval before an unexpected power-off, the snapshot module 208 captures the physical addresses of the four starting blocks of $BLOCK_{L\_G}$, $BLOCK_{P\_G}$, $BLOCK_{W\_L}$, and $BLOCK_{M\_T}$, and records them in the physical space $A_{12}$, $A_{22}$, $A_{32}$ and $A_{42}$ as initial addresses. When the power is restored, the four starting blocks of $BLOCK_{L\_G}$, $BLOCK_{P\_G}$, $BLOCK_{W\_L}$ and $BLOCK_{M\_T}$ are obtained by the power-off recovery module 212 by accessing the physical space $A_{12}$, $A_{22}$, $A_{32}$ and $A_{42}$. Thus, the updating information stored in the obtained blocks is available and are collected to recover the RAM 204.

The snapshot module 208, recording module 210 and power-off recovery module 212 may be combined within the memory control unit 206 as hardware circuits, or, in other embodiments, may be implemented by software, hardware or a hardware/software co-design.

Note that the NAND flash 202 may be replaced by other non-volatile memories and the RAM 204 may be implemented by other high-speed access memories for storing the dynamic information of the non-volatile memory.

Methods for data storage are disclosed as well as the data storage system. A first memory (e.g. the NAND flash 202 of FIG. 2) is provided to the user for data storage. A second memory (e.g. the RAM 204 of FIG. 2) is provided to store dynamic information of the first memory, wherein the dynamic information may be a logical-to-physical address mapping table, a bad block indication, or other dynamically changed information of the first memory. In an exemplary embodiment, a snapshot interval is provided to store an initial address indicating a starting block in the first memory, wherein the starting block is allocated for a subsequent normal operation, and the initial address is recorded in the first memory. After the snapshot interval is a normal operation interval. The allocated blocks of the first memory which are allocated to use during the normal operation interval provide free space to record the corresponding updating information and the link information between the allocated blocks. If an unexpected power-off occurs, power-off recovery is provided when the power is restored. During a power-off recovery interval, the initial address, the updating information and the link information that are recorded in the first memory, during the snapshot and normal operation intervals, are utilized to recover the dynamic information of the first memory contained in the second memory without being affected by the unexpected power-off.

In an exemplary embodiment, the updating information may be a "logical address". Each block of the first memory may be further divided into a plurality of pages. Each physical page may correspond to one logical address. During the normal operation interval, the recording of the updating information includes recoding the logical address of each page of the allocated blocks, wherein the logical address is recorded in the free space of a corresponding page. In an exemplary embodiment wherein the link information between the allocated blocks is recorded during the normal operation interval, the next block is allocated when the current block is still under use, and the physical address of the next block is recorded in a free space of a current block as the link information between the current block and the next block. For example, the physical address of the next block may be recorded in a free space of an arbitrary page of a current block. As shown in FIG. 3, the free space Ai4 of the most recent page page(i, n) of the block blocki may be designed to record the link information. In some exemplary embodiments, during the power-off recovery interval, the allocated blocks altered in the most recent normal operation interval before the unexpected power-off may be obtained from the initial address and the link information recorded previously and, according to the updating information stored in the allocated blocks, the second memory may be recovered to a state before the unexpected power-off. The allocated blocks may be obtained by the steps as follows. According to the initial address, the starting block allocated for a subsequent normal operation is obtained. According to the link information stored in the starting block, a subsequently allocated block is obtained. By observing the link information, it is determined whether other blocks were allocated during the most recent normal operation interval before the unexpected power-off. If no link information is obtained, it represents that the most recent allocated block has been obtained. In some embodiments, the most recent allocated block is determined when at least one blank page is obtained. The block including the blank page may be considered as the most recent block used when an unexpected power-off occurs. In another exemplary embodiment, the dynamic information stored in the second memory is updated to the first memory during the snapshot interval. During the power-off recovery interval, the copy of the dynamic information is corrected by the updating information recorded in the allocated blocks, to recover the second memory to a state before the unexpected power-off.

The snapshot and normal operation intervals happen by turns. The snapshot interval may happen every predetermined time period, or, may occur every time a predetermined amount of data is stored to the first memory.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A data storage system, comprising:
   a first memory, being non-volatile and including a plurality of blocks;
   a second memory, storing dynamic information of the first memory; and
   a memory control unit coupled to the first and second memories, comprising:
   a snapshot module, working during a snapshot interval, storing an initial address into the first memory, wherein the initial address indicates a starting block in the first memory that is allocated for a subsequent normal operation;
   a recording module, working during a normal operation interval, recording updating information to free space of allocated blocks of the first memory, and recording link information between the allocated blocks, wherein the allocated blocks are the blocks altered during the normal operation interval; and
   a power-off recovery module, working during a power-off recovery interval, utilizing the initial address that the snapshot module stored in the first memory and the link information and the updating information that the recording module recorded in the allocated blocks to recover the second memory so that it contains the dynamic information of the first memory without being affected by an unexpected power-off,
   wherein the recording module records a physical address of a second block as the link information, and stores the link information to free space of a first block, wherein the first block and the second block are of the allocated blocks of the first memory.

2. The system as claimed in claim 1, wherein the snapshot and the normal operation intervals happen alternatively.

3. The system as claimed in claim 1, wherein, based on the initial address and the link information, the power-off recovery module obtains the allocated blocks, and thereby combines the updating information recorded in the allocated blocks to recover the second memory.

4. The system as claimed in claim 1, wherein, during the snapshot interval, the snapshot module further updates the dynamic information stored in the second memory to the first memory.

5. The system as claimed in claim 1, wherein the dynamic information includes a logical-to-physical address mapping table, and the updating information includes logical addresses.

6. The system as claimed in claim 5, wherein each block of the first memory is further divided into a plurality of pages, and each page corresponds to one of said logical addresses.

7. The system as claimed in claim 1, wherein the second block is allocated subsequently to the first block.

8. The system as claimed in claim 1, wherein each block of the first memory is further divided into a plurality of pages and the physical address of the second block is recorded in a free space of one arbitrary page of the first block.

9. The system as claimed in claim 1, wherein the snapshot interval happens every predetermined time period, or happens every time a predetermined amount of data is stored to the first memory.

10. The system as claimed in claim 1, wherein the first memory is a NAND flash.

11. The system as claimed in claim 1, wherein the second memory is a random access memory.

12. A data storage method, comprising:
    providing a first memory for data storage, wherein the first memory is non-volatile and includes a plurality of blocks;
    providing a second memory to store dynamic information of the first memory;
    storing an initial address into the first memory during a snapshot interval, wherein the initial address indicates a starting block in the first memory, the starting block is allocated for a subsequent normal operation;
    recording updating information to free space of allocated blocks of the first memory, and recording link information between the allocated blocks, wherein the allocated blocks are the blocks altered during a normal operation interval, and the recording of the updating information and the link information is performed during the normal operation interval;
    wherein when an unexpected power-off occurs, utlizing the initial address stored during the snapshot interval and the updating information and the link information recorded during the normal operation interval to recover the dynamic information stored in the second memory;
    wherein a physical address of a second block is recorded as the link information and stored to free space of a first block, wherein the first block and the second block are of the allocated blocks of the first memory.

13. The method as claimed in claim 12, wherein the snapshot and normal operation intervals happen alternatively.

14. The method as claimed in claim 12, wherein the steps executed to recover the dynamic information stored in the second memory further comprise:
    obtaining the allocated blocks according to the initial address and the link information, and combining the updating information stored in the allocated blocks to recover the dynamic information stored in the second memory.

15. The method as claimed in claim 12, wherein the dynamic information includes a logical-to-physical address mapping table, and the updating information includes logical addresses.

16. The method as claimed in claim 15, wherein each block of the first memory is further divided into a plurality of pages, and each page corresponds to one of said logical addresses, and the step of recording the updating information during the normal operation interval includes:

recording the logical addresses of the pages of the allocated blocks to the corresponding pages.

17. The method as claimed in claim 12, wherein the step of recording the link information between the allocated blocks includes:

allocating the second block for subsequent normal operations when the first block is being used.

18. The method as claimed in claim 12, wherein the steps performed to recover the dynamic information stored in the second memory further comprise:

determining that the second block is the most recent allocated block of the allocated blocks when no link information is obtained from the second block.

19. The method as claimed in claim 12, wherein the steps performed during the snapshot interval further comprises:

updating the dynamic information stored in the second memory to the first memory.

20. The method as claimed in claim 12, wherein the snapshot interval happens every predetermined time period, or the snapshot interval happens every time a predetermined amount of data is stored to the first memory.

\* \* \* \* \*